United States Patent Office 3,451,983
Patented June 24, 1969

3,451,983
PROCESS FOR PYROLYZING COPOLYMERS OF ETHYLENE AND VINYL ESTERS
Pieter van Saane, Geleen, and Johannes M. Frielink, Sittard, Netherlands, assignors to Stamicarbon N.V., Heerlen, Netherlands
No Drawing. Filed May 2, 1966, Ser. No. 546,564
Claims priority, application Netherlands, May 7, 1965, 6505800
Int. Cl. C08f 27/26
U.S. Cl. 260—87.3                    12 Claims

ABSTRACT OF THE DISCLOSURE

A process for pyrolyzing copolymers of ethylene and vinyl esters by heating them in the presence of an organic diluent at a temperature of between 225 and 350° C. and at a pressure of at least 90 atmospheres.

---

The present invention relates to the pyrolyzing of copolymers of ethylene and vinyl esters.

It is commonly known that copolymers of ethylene and vinyl esters can be pyrolyzed by heating them at a temperature of between 250 and 400° C., and preferably between 280 and 325° C., in the presence of an inert gas or a solvent. As a result acyloxy groups are expelled from the polymer chains and double bonds form between the carbon atoms to which these groups were bound and the adjacent carbon atoms. The unsaturated copolymers thus obtained can be vulcanized with sulphur. This type of process is described in the United States patent specification 2,388,169.

This process has the drawback that the resulting unsaturated copolymers are also cross-linked to a high degree. This causes the resulting product to have so high a molecular weight that it must be decomposed before it can be processed.

An object of the present invention is to provide a process of pyrolyzing such copolymers in which cross-linking is suppressed to such an extent that the resulting product need not be decomposed.

Another object of the invention is to provide vulcanized unsaturated copolymers of ethylene and vinyl esters that have better elastomeric properties, in particular a higher tensile strength, than those obtained by the known process.

A still further object of the invention is to provide unsaturated copolymers of ethylene and vinyl esters that are suitable for use in the bonding of rubbers to textiles by the process described in the United States patent application Ser. No. 546,610 of Henricus J. M. van Gorcom entitled "Process for Bonding Rubber to Textiles," which has been filed simultaneously with the present application.

According to the invention the above objects can be achieved by carrying out the pyrolysis at a temperature of between 225 and 350° C. and a pressure of at least 90 atm.

Essentially, the present invention consequently relates to a process for pyrolyzing copolymers of ethylene and vinyl esters by heating them in the presence of a diluent at a temperature of between 225 and 350° C. and a pressure of at least 90 atm.

It was quite unexpected to discover that cross-linking during the pyrolysis can be prevented by carrying out the process at elevated pressure. It has been determined, that the rate of the pyrolysis increases with pressure. Consequently, to obtain a given degree of unsaturation, a lower temperature and/or a shorter heating time can be applied, when the pressure is higher. This appears to suppress cross-linking.

The copolymers of ethylene and vinyl esters to which the process according to the invention can be applied include copolymers of ethylene and vinyl esters of organic acids, such as vinyl acetate, vinyl propionate, vinyl butyrate, and vinyl esters of higher aliphatic organic acids with straight or branched chains, and also vinyl esters of aromatic carboxylic acids, such as benzoic acid. In particular the vinyl esters of acetic acid give very favorable results.

The vinyl-ester content of the copolymers may vary from 0.5 to 30 moles percent, but preferably ranges between 0.5 and 20 moles percent. Copolymers with a vinyl-ester content of below about 2 moles percent still show a strong resemblance to polyethylene, those with a vinyl-ester content of over about 10 moles percent have a distinctly elastomeric nature, and those with a vinyl-ester content of between 2 and 10 moles percent have the properties of softened polyvinyl chloride.

The copolymers can be prepared according to known methods by heating a mixture of ethylene and a vinyl ester under pressure in the presence of free radicals. The polymerization may be carried out either batch-wise or continuously and the monomers may or may not be dissolved or emulsified in a distributing agent.

The pressure used in the pyrolysis may vary from 90 to 2000 atm. or may be even higher. However, it has been found that cross-linking can be sufficiently suppressed at a pressure of between 200 and 1000 atm., so that it is not necessary to use a very high pressure.

The pyrolysis is carried out at a temperature of between 225 and 350° C., but preferably of between 240 and 280° C.

The pyrolysis is continued until the product has the number of double bonds required for the vulcanization. A number of 0.5–5 double bonds per 100 carbon atoms of the polymer chain is usually sufficient.

The duration of the pyrolysis depends on the pressure and temperatures used and usually ranges between 10 and 120 minutes.

The diluent used may be an aromatic or an aliphatic hydrocarbon, such as benzene, xylene, toluene, cyclohexane, and hexane.

Ethylene has been found to be a very suitable diluent. The use of ethylene offers the advantage that no foreign diluents need be introduced, and the ethylene contained in the polymerization reactor can be used, which is already present under a high pressure. This makes it possible to carry out the pyrolysis in a simple way immediately after the polymerization by heating the resulting reaction mixture, if so desired, after it has been transferred to another vessel and the pressure has been adjusted to the desired value.

When ethylene is used as diluent, it is desirable to carry out the pyrolysis in the presence of a radical trap to prevent decomposition of the ethylene. Radical traps that may be used are, for instance, hydrochinone or antioxidants, preferably those of the type of the sterically hindered phenols, such as 4,4'-thiobis-(6-tert.butyl metacresol). These substances are generally used in an amount of 0.01–1% by weight with respect to the copolymer.

The unsaturated copolymers obtained by the process according to the invention can be vulcanized with sulphur, in the conventional manner as used for natural rubber, to elastomers having better properties, in particular a higher tensile strength, than those obtained by the known processes. In addition, these unsaturated copolymers are particularly suitable for use in the process for bonding rubber to textiles described in the abovementioned U.S. patent application of van Gorcom.

The following specific examples are illustrative only and should not be construed as limiting the scope of the invention.

Example 1

100 g. of a copolymer of ethylene and vinyl acetate with a vinyl acetate content of 18 moles percent and a molecular weight of 21,000 is dissolved in 400 g. of xylene to which 1 g. of 4,4'-thiobis-(6-tert. butyl metacresol) has been added. This solution is transferred to an autoclave, where it is heated at a temperature of 260° C. and an ethylene pressure of 250 atm. for 110 minutes.

At the end of the pyrolysis the copolymer is still completely dissolved in the xylene, which shows that hardly any cross-linking has occurred. The resulting copolymer contains one C=C bond to every hundred carbon atoms in the chain.

100 g. of this copolymer is mixed with 1 g. of stearic acid, 5 g. of zinc oxide, 30 g. of high abrasion furnace black, 1 g. of tetramethyl thiuram disulphide, 0.5 g. of 2-mercaptobenzothiazole, and 1.5 g. of sulphur. This mixture is vulcanized for 10 minutes at a temperature of 160° C. The rubber thus obtained has the following properties: hardness (Shore A): 74, rigidity at 200% elongation: 91 kg./cm.$^2$, rigidity at 300% elongation: 157 kg./cm.$^2$, tensile strength: 212 kg./cm.$^2$, and elongation at rupture: 390%.

Example 2

A number of samples of a copolymer of ethylene and vinyl acetate with an average molecular weight of 21,000 and an oxygen content of 15.5% by weight are pyrolyzed under the conditions given in the following table.

| | | | | | Product | |
|---|---|---|---|---|---|---|
| Exp. No. | Temp., °C. | Pressure, atm. | Vehicle | Time, min. | Oxygen content, percent by weight | C=C per 100 C atoms in the chains |
| 1 | 275 | 100 | $C_2H_4$ | 30 | 13.7 | 1.5 |
| 2 | 275 | 250 | $C_2H_4$ | 30 | 11.9 | 2.9 |
| 3 | 275 | 750 | $C_2H_4$ | 30 | 9.9 | 4.3 |
| 4 | 275 | [1]500 | $N_2$+cyclohexane | 30 | | |
| 5 | 275 | [1]500 | $N_2$+xylene | 30 | | |
| 6 | 240 | 1500 | $C_2H_4$ | 30 | 13.8 | 1.5 |
| 7 | 250 | [1]900 | $C_2H_4$+xylene | 15 | 12.0 | 2.8 |

[1] In these cases a solution of 20% by weight of the copolymer in cyclohexane or xylene is prepared, after which so much nitrogen or ethylene is pressed into the reaction vessel that the required pressure has been reached.

From the table it appears that the rate of the pyrolysis increases with pressure.

The resulting products can be readily processed and can be converted to elastomeric products with excellent properties by vulcanization with sulphur.

It will be obvious to those skilled in the art that various changes may be made without departing from the spirit of the invention and therefore the invention is not limited to what is described in the specification, but only as indicated in the appended claims.

What is claimed is:

1. A process for pyrolyzing a copolymer of ethylene and a vinyl ester which comprises heating the copolymer in the presence of a hydrocarbon diluent at a temperature of between 225 and 350° C. at a pressure of at least 90 atm., said copolymer having a vinyl ester content of from 0.5–30 moles percent.

2. A process according to claim 1, wherein the pyrolysis is carried out at a temperature of between 240 and 280° C.

3. A process according to claim 1, wherein the pyrolysis is carried out at a pressure of between 200 and 1000 atm.

4. A process according to claim 2, wherein the pyrolysis is carried out at a pressure of between 200 and 1000 atm.

5. A process according to claim 1, wherein the diluent used is ethylene.

6. A process according to claim 5, wherein the pyrolysis is carried out in the presence of 0.01–1% by weight with respect to the copolymer of a radical trap.

7. A process according to claim 6, wherein the radical trap is a sterically hindered phenol anti-oxidant.

8. A process according to claim 1, wherein the resulting pyrolyzed copolymer is vulcanized.

9. A process according to claim 4, wherein the copolymer pyrolyzed is a copolymer of ethylene and vinyl acetate.

10. A process according to claim 1, wherein the pyrolysis is continued until an unsaturation of 0.5–5 double bonds per 100 atoms of the polymer chain is obtained.

11. A process according to claim 4, wherein the copolymer is a copolymer of ethylene and vinyl acetate, the diluent is ethylene, and the pyrolysis is carried out for 10–120 minutes in the presence of a sterically hindered phenol anti-oxidant.

12. A process according to claim 11, wherein the resulting copolymer is vulcanized.

References Cited

UNITED STATES PATENTS

| 2,388,169 | 10/1945 | McAlevy | 260—79 |
| 2,935,502 | 5/1960 | Reding | 260—94.9 |
| 3,087,922 | 4/1963 | Whittington | 260—94.9 |
| 3,153,028 | 10/1964 | Tabar | 260—94.9 |
| 3,344,129 | 9/1967 | Bestian | 260—87.3 |

JOSEPH L. SCHOFER, Primary Examiner.

J. C. HAIGHT, Assistant Examiner.

U.S. Cl. X.R.

260—94.9, 96